United States Patent Office 3,779,984
Patented Dec. 18, 1973

3,779,984
HALOGENATED CARBONATES AS FIRE RETARDANTS FOR POLYESTERS
Jurgen H. Exner, Eric R. Larsen, and Jeffrey A. Gunsher, Midland, Mich., assignors to The Dow Chemical Company, Midland, Mich.
No Drawing. Original application Aug. 3, 1970, Ser. No. 60,778, now Patent No. 3,688,001. Divided and this application July 14, 1972, Ser. No. 272,016
Int. Cl. C08g 51/54
U.S. Cl. 260—45.7 R
10 Claims

ABSTRACT OF THE DISCLOSURE

New halogenated carbonates containing halogenated neopentyl groups have been found which are extremely useful as fire retardant additives for polyesters.

CROSS-REFERENCE TO OTHER APPLICATION

This is a divisional application of our pending U.S. patent application Ser. No. 60,778, filed Aug. 3, 1970, now U.S. Pat. 3,688,001.

BACKGROUND OF THE INVENTION

Considerable research has been done to find a suitable fire retardant for polyesters, especially polyester fiber. Finding a suitable fire retardant has been difficult because of the high temperatures involved in processing polyesters. Such temperatures usually range from about 290° to about 300° C. Normal fire retardant additives degrade at such temperatures to cause color forming impurities which adversely affect the commercial desirability of the end product.

Decabromodiphenyl oxide and octabromobiphenyl have been found to be suitable fire retardants for polyester fibers, but the large amount of fire retardant necessary to make the polyester self-extinguishing deleteriously affects the physical integrity of the polyester. Furthermore, the light sensitivity of the halogenated aromatic compounds causes them to degrade. The resulting color upon extended exposure to light decreases their commercial desirability.

SUMMARY OF THE INVENTION

It has now been found according to the present invention that halogenated aliphatic carbonates having the general formula

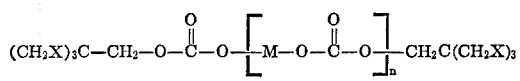

wherein

M is independently

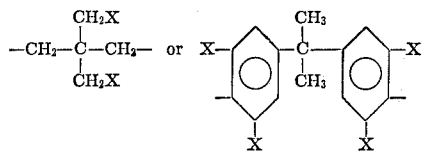

X is independently Br or Cl, and
$n$ is an integer of 0 to 10 are suitable and effective fire retardant additives for polyesters, especially polyethylene terephthalate. In the process of preparing the fire retardant polyester, the fire retardant agent of the invention is incorporated physically into a melt of the polyester and the polyester containing the fire retardant is processed to give the desired product.

Thus, the invention comprises the new compounds which have been found to be especially effective fire retardants for polyesters, a method for making polyester fire retardant, and the final composition of the polyester containing the fire retardant compound.

The compounds may be prepared by the well-known carbonate reaction where a mono- or dihydric alcohol is reacted with phosgene to form a carbonate ester. For the fire retardant additives of the invention, phosgene or a chloroformate is reacted with a trihaloneopentyl alcohol, dihaloneopentyl glycol or tetrahalobisphenol A in the proportions necessary to obtain the desired compound of the general formula. Such reactions are generally conducted in the presence of a base catalyst such as pyridine, sodium hydroxide or sodium carbonate, with weak bases such as pyridine being preferred. Normal room temperature may suitably be employed to obtain the desired reaction and pressure may be applied as needed to maintain the liquid phase. After the reaction is completed, the product may be isolated by any conventional means of isolation such as crystallization or distillation.

The compounds of the invention may be any of those corresponding to the general formula above. In a specific preparation of a compound wherein M is dihaloneopentanediyl and $n$ is 4, phosgene is reacted with trihaloneopentyl alcohol to form the chloroformate, then dihaloneopentyl glycol and phosgene are alternately reacted to give a molecule having 4 units of the neopentyl glycol and terminal hydroxyls. This product is then reacted with trihaloneopentyl chloroformate to give the desired compound. In like manner, tetrahalobisphenol A may be substituted for the glycol, or a mixture of tetrahalobisphenol A and dihaloneopentyl glycol may be reacted with phosgene to prepare suitable compounds of the invention. In preferred compounds, $n$ is an integer of 0 to 5, with compounds where $n$ is 0 to 2 being especially preferred. Of special interest are:

Compound 1

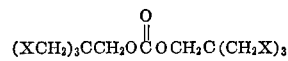

Compound 2

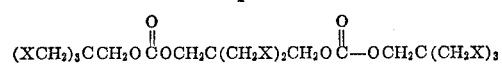

Compound 3

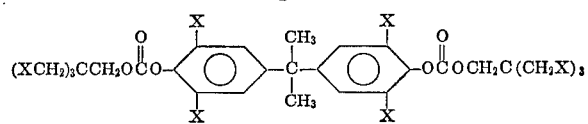

Also of special interest are compounds wherein each X is Br.

In the process for making the polyester fire retardant the additive of the present invention is incorporated physically into the polyester by making a melt of the polyester and then physically mixing the fire retardant additive with the polyester. The fire retardant additive is compatible and may be mechanically blended with the polyester to give a mixture of essentially homogeneous composition. The amount of additive employed in the process may vary widely but any quantity of additive imparts some fire retardant characteristics to the final product. Such amounts generally range from about 0.5 to about 10% by weight of halogen in the fire retardant compound based on the weight of the polyester with amounts of about 1 to about 7% by weight being preferred. Larger amounts of the fire retardant may be employed in the polyester, but excessive amounts tend to have a deleterious effect upon the physical integrity of the resultant polyester.

After the incorporation of the fire retardant additive, the polyester is processed in the normal manner at temperatures of about 290° to 300° C. The special desirability of the fire retardants of the invention is due to the fact that they do not materially degrade to give a colored product or cause degradation of the polyester, but rather produce a clear product having fire retardant characteristics. The polyester may then be extruded into fiber or molded or shaped into any form and still maintain its desirable commercial qualities.

SPECIFIC EMBODIMENTS

Example 1.—Preparation of Compound 1 (where X=Br)

In a reactor was placed 38.8 g. (0.10 mole) of 3-bromo-2,2-bis(bromomethyl)propyl chloroformate, 32.5 g. (0.10 mole) of tribromoneopentyl alcohol and 150 ml. of benzene. To this mixture was added a solution of 12.5 ml. of pyridine and 30 ml. of benzene with slight cooling over a 10 minute period. The reaction mixture was stirred at room temperature overnight and then the product was hydrolyzed by addition of 100 ml. of 5% hydrochloric acid. The benzene layer was washed twice with 100 ml. of water and dried over anhydrous sodium sulfate. The benzene was decanted and evaporated to yield 65 g. of light crystals which were recrystallized from carbon tetrachloride. The recrystallized material had a melting point of 109.5° to 111° C. The crystals were analyzed by nuclear magnetic resonance spectroscopy and infrared analysis and found to be the desired carbonate.

Example 2.—Preparation of Compound 2 (where X=Br)

In a manner similar to that described in Example 1, 38.8 g. (0.10 mole) of 3-bromo-2,2-bis(bromomethyl) propyl chloroformate, 13.1 g. (0.05 mole) of dibromoneopentyl glycol and 250 ml. of benzene were mixed and a solution of 8 ml. of pyridine and 40 ml. of benzene was added. After the reaction mixture was stirred for 32 hours, the product was hydrolyzed with hydrochloric acid and a white solid was obtained which was recrystallized from chloroform. The crystals weighed 39.7 g. and had a melting point of 106° to 110° C.

Example 3.—Preparation of Compound 3 (where X=Br)

In the same manner as shown in Example 1, 38.8 g. (0.10 mole) of 3-bromo-2,2-bis(bromomethyl)propyl chloroformate, 27.2 (0.05 mole) of tetrabromobisphenol A and 250 ml. of benzene were charged to a reactor. To this mixture 8 ml. of pyridine in 40 ml. of benzene was added and the reaction mixture was stirred overnight. After hydrolysis, washing and drying, the benzene layer was evaporated to give a solid material. The solid was dissolved in chloroform, treated with charcoal and recrystallized from benzene to give 42 g. of a white solid having a melting point of 187° to 191° C. The product was identified by nuclear magnetic resonance spectroscopy as the expected Compound 3.

Example 4.—Fire retardancy in polyester

Using the screening method ASTM D-2863, compounds of the invention were compared to decabromodiphenyl oxide and octabromobiphenyl as fire retardant additives. In the test procedure, a mixture of polyethylene terephthalate and the desired amount of fire retardant to give the indicated percentage of bromine were mixed at 250° C. using a Brabender mixer. The mixture was then removed from the mill and ground to a powder. A sample was then fabricated by molding it at a pressure of 17 to 30 tons per square inch at 290° to 300° C. on a fiber glass support. A strip of the material 4" by ¼" by ⅛" was cut and burned in a limiting oxygen index test (LOI) as described in Combustion and Flame, 10, 135 (1966). Compounds giving high LOI for small amounts of additive are most desirable. The results of these examinations are shown in the following table.

TABLE

Comparative fire retardancy in polyester

| Sample | Additive | Weight percent Br | LOI |
|---|---|---|---|
| Comp. A | None | | 0.205 |
| Comp. B | Decabromodiphenyl oxide | 10 | 0.274 |
| Comp. C | do | 5 | 0.255 |
| Comp. D | Octabromobiphenyl | 7 | 0.283 |
| Comp. E | do | 5 | 0.261 |
| Comp. F | do | 3 | 0.248 |
| Comp. G | do | 1 | 0.222 |
| 1 | Compound 1 | 3 | 0.258 |
| | do | 1 | 0.231 |
| | Compound 2 | 5 | 0.277 |
| | Compound 3 | 5 | 0.271 |

Example 5.—Light stability

The light stability of the test samples of Example 4 were examined by placing the samples 7" from a 100 watt AH-4 mercury vapor lamp. Samples Comp. B and C containing decabromodiphenyl oxide turned yellow within 48 hours, Samples Comp. D-G containing octabromobiphenyl turned yellow in 10 days, but Comp. A with no additive and Samples 1-4 containing additives of the invention showed no discoloration even after 14 days. At these concentrations, the relative amounts appeared to have little or no effect on the light stability.

In the same manner as described in the examples above, other compounds of the invention may be prepared by reacting dibromoneopentyl glycol or tetrabromobisphenol A with phosgene to form alternating units of the glycol or tetrabromobisphenol A and phosgene and terminal chloroformate radicals and then reacting these compounds with two moles of tribromoneopentyl alcohol per mole of the compounds formed until all of the compounds have been capped. These compounds may be incorporated into polyethylene terephthalate to give superior fire retardency.

Also in the same manner as shown above, chlorinated neopentyl alcohol, neopentyl glycol and bisphenol A may be used to prepare a compound of the invention or chlorinated and brominated reactants containing both bromine and chlorine may be used to prepare mixed halogen compounds.

Representative examples of these compounds include:

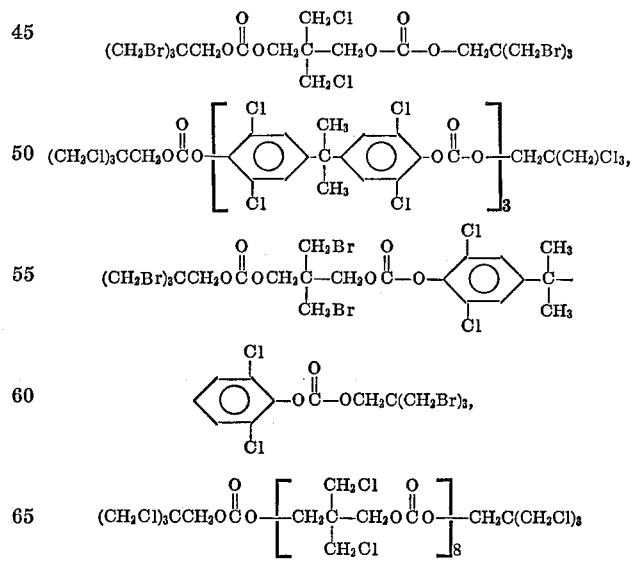

We claim:

1. A composition of matter comprising a polyester fiber containing as a fire retardant an effective amount of a compound of the formula

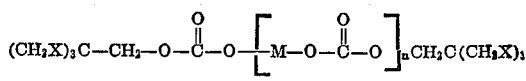

wherein
M is independently

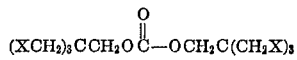

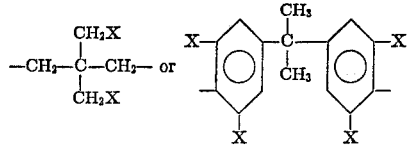

X is independently Br or Cl, and
n is an integer of 0 to 10.

2. The composition of matter of claim 1 wherein, in the fire retardant, n is an integer of 0 to 5.
3. The composition of matter of claim 1 wherein, in the fire retardant, n is an integer of 0 to 2.
4. The composition of matter of claim 1 wherein the fire retardant compound is of the general formula

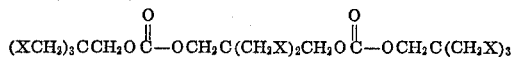

wherein X is independently Br or Cl.

5. The composition of matter of claim 1 wherein the fire retardant compound is of the general formula $$(XCH_2)_3CCH_2O\overset{O}{\underset{\|}{C}}-OCH_2C(CH_2X)_2CH_2O\overset{O}{\underset{\|}{C}}-OCH_2C(CH_2X)_3$$

wherein X is independently Br or Cl.

6. The composition of matter of claim 1 wherein the fire retardant compound is of the general formula

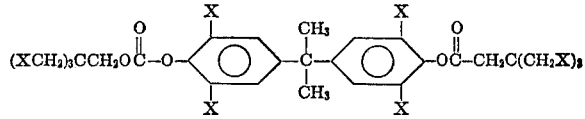

wherein X is independently Br or Cl.

7. The composition of matter of claim 1 containing about 0.5 to about 10% by weight of halogen in the fire retardant compound based on the weight of the polyester.
8. The composition of matter of claim 1 containing about 7% by weight of halogen in the fire retardant compound based on the weight of the polyester.
9. The composition of matter of claim 8 wherein the polyester is polyethylene terephthalate.
10. The composition of matter of claim 9 wherein the fire retardant compound is

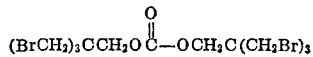

References Cited
UNITED STATES PATENTS 3,624,024   11/1971   Caldwell et al. ____ 260—45.7 R DONALD E. CZAJA, Primary Examiner
G. R. MARSHALL, Assistant Examiner U.S. Cl. X.R.

252—8.1

UNITED STATES PATENT OFFICE
CERTIFICATE OF CORRECTION

Patent No. 3,779,984    Dated December 18, 1973

Inventor(s) Jurgen H. Exner, Eric R. Larsen and Jeffrey A. Gunsher

It is certified that error appears in the above-identified patent and that said Letters Patent are hereby corrected as shown below:

Column 6, line 10 (Claim 8, line 1), add after "containing" --about 1 to--.

Signed and sealed this 29th day of October 1974.

(SEAL)
Attest:

McCOY M. GIBSON JR.
Attesting Officer

C. MARSHALL DANN
Commissioner of Patents